United States Patent
Ha et al.

(10) Patent No.: US 9,662,610 B2
(45) Date of Patent: May 30, 2017

(54) SCR CATALYST FOR REMOVAL OF NITROGEN OXIDES

(71) Applicants: Heon-Phil Ha, Gyeonggi-Do (KR); Soon-Hyo Chung, Seoul (KR); Young-Joo Oh, Seoul (KR)

(72) Inventors: Heon-Phil Ha, Gyeonggi-Do (KR); Soon-Hyo Chung, Seoul (KR); Young-Joo Oh, Seoul (KR)

(73) Assignee: KOREA INSTITUTE OF SCIENCE AND TECHNOLOGY (KR)

(*) Notice: Subject to any disclaimer, the term of this patent is extended or adjusted under 35 U.S.C. 154(b) by 0 days.

(21) Appl. No.: 15/159,133

(22) Filed: May 19, 2016

(65) Prior Publication Data

US 2016/0256822 A1    Sep. 8, 2016

Related U.S. Application Data

(60) Division of application No. 14/228,909, filed on Mar. 28, 2014, now abandoned, and a continuation of
(Continued)

(30) Foreign Application Priority Data

Jul. 19, 2005    (KR) .................. 10-2005-0065430

(51) Int. Cl.
*B01D 53/86*    (2006.01)
*B01J 23/18*    (2006.01)
(Continued)

(52) U.S. Cl.
CPC ..... *B01D 53/8628* (2013.01); *B01D 53/9418* (2013.01); *B01J 23/22* (2013.01); *B01D 2251/2062* (2013.01); *B01D 2255/2098* (2013.01); *B01D 2255/20707* (2013.01); *B01D 2255/20723* (2013.01)

(58) Field of Classification Search
CPC ....... B01D 53/8628; B01J 23/18; B01J 23/22; B01J 21/063
USPC ..... 423/239.1; 502/242, 246, 247, 249, 349, 502/350, 353, 355, 415, 439
See application file for complete search history.

(56) References Cited

U.S. PATENT DOCUMENTS

| 3,265,712 A | 8/1966 | Jennings |
| 3,346,659 A | 10/1967 | Gasson et al. |

(Continued)

FOREIGN PATENT DOCUMENTS

| JP | 07-124478 A | 5/1995 |
| KR | 1981-536 B1 | 5/1981 |

OTHER PUBLICATIONS

Official Communication issued May 13, 2015 by Chinese Patent Office in connection with corresponding Chinese application No. 200680030251.8 and English translation thereof.
(Continued)

*Primary Examiner* — Cam N. Nguyen
(74) *Attorney, Agent, or Firm* — Ostrolenk Faber LLP

(57) ABSTRACT

The present invention provides for catalysts for selective catalytic reduction of nitrogen oxides. The catalysts comprise metal oxide supporters, vanadium, an active material, and antimony, a promoter that acts as a catalyst for reduction of nitrogen oxides, and at the same time, can promote higher sulfur poisoning resistance and low temperature catalytic activity. The amount of antimony of the catalysts is preferably 0.5-7 wt. %.

7 Claims, 3 Drawing Sheets

Related U.S. Application Data application No. 11/996,151, filed as application No. PCT/KR2006/000098 on Jan. 10, 2006, now abandoned.

(51) Int. Cl.
 *B01J 23/22* (2006.01)
 *B01J 21/06* (2006.01)
 *B01D 53/94* (2006.01)

(56) References Cited

U.S. PATENT DOCUMENTS

| | | | |
|---|---|---|---|
| 3,475,350 | A | 10/1969 | Winnick et al. |
| 3,544,617 | A | 12/1970 | Oga Taijiro et al. |
| 3,546,138 | A | 12/1970 | Callahan et al. |
| 3,657,155 | A | 4/1972 | Yoshino et al. |
| 3,803,156 | A | 4/1974 | Yokayama et al. |
| 3,810,921 | A | 5/1974 | Masellie et al. |
| 3,862,960 | A | 1/1975 | Cheavens et al. |
| 3,873,595 | A | 3/1975 | Lussling et al. |
| 3,917,682 | A | 11/1975 | Mizukami et al. |
| 4,036,783 | A | 7/1977 | Blechschmitt et al. |
| 4,151,182 | A | 4/1979 | Engelbach et al. |
| 4,176,091 | A | 11/1979 | Inaba et al. |
| 4,221,768 | A | 9/1980 | Inoue et al. |
| 4,282,116 | A | 8/1981 | Reuter et al. |
| 4,339,598 | A | 7/1982 | Guttmann et al. |
| RE31,364 | E | 8/1983 | Wise |
| 4,400,306 | A | 8/1983 | Dria et al. |
| 4,407,734 | A | 10/1983 | Denton et al. |
| 4,508,848 | A | 4/1985 | Dolhyj et al. |
| 4,528,277 | A | 7/1985 | Hass et al. |
| 4,746,641 | A | 5/1988 | Guttmann et al. |
| 4,784,979 | A | 11/1988 | Toft et al. |
| 4,791,092 | A | 12/1988 | Wachs et al. |
| 4,849,391 | A | 7/1989 | Riva et al. |
| 4,855,457 | A | 8/1989 | Ramzi et al. |
| 4,879,387 | A | 11/1989 | Hara |
| 4,931,418 | A | 6/1990 | Cullo et al. |
| 5,094,989 | A | 3/1992 | Lynch et al. |
| 5,498,588 | A | 3/1996 | Brazdil et al. |
| 5,658,844 | A | 8/1997 | Hippel et al. |
| 5,747,411 | A | 5/1998 | Karrer et al. |
| 5,892,049 | A | 4/1999 | Hippel et al. |
| 5,952,262 | A | 9/1999 | Karrer et al. |
| 6,013,599 | A | 1/2000 | Manson |
| 6,274,763 | B1 | 8/2001 | Ruedinger et al. |
| 6,362,345 | B1 | 3/2002 | Heidemann et al. |
| 6,413,903 | B1 | 7/2002 | Kourtakis |
| 6,506,356 | B1 | 1/2003 | Chung et al. |
| 6,586,361 | B1 | 7/2003 | Heidemann et al. |
| 6,700,000 | B1 | 3/2004 | Heidemann et al. |
| 6,710,011 | B2 | 3/2004 | Mamedov et al. |
| 6,864,384 | B2 | 3/2005 | Brazdil et al. |
| 6,958,427 | B2 | 10/2005 | Park et al. |
| 2004/0254379 | A1 | 12/2004 | Verma et al. |
| 2007/0093384 | A1 | 4/2007 | Storck et al. |
| 2007/0213210 | A1 | 9/2007 | Verma et al. |

OTHER PUBLICATIONS

S.T. Choo, et al., *Applied Catalysis B: Environment* 44 (2003), columns 237-252, published on Aug. 8, 2003 at pp. 65-87.

SCR CATALYST FOR REMOVAL OF NITROGEN OXIDES

CROSS-REFERENCE TO RELATED APPLICATIONS

The present application is a divisional under 37 C.F.R. §1.53(b) of prior application Ser. No. 14/228,909 filed Mar. 28, 2014, which is a continuation of U.S. application Ser. No. 11/996,151, filed Jul. 16, 2008, which is a 35 U.S.C. §§371 national phase conversion of PCT/KR2006/000098, filed Jan. 10, 2006, which claims priority of Korean Patent Application No. 10-2005-0065430, filed Jul. 19, 2005, the disclosure of which has been incorporated herein by reference.

BACKGROUND OF THE INVENTION

Technical Field

The present invention relates to catalysts for selective reduction of nitrogen oxides, and more particularly to catalysts for removal of nitrogen oxides that have enhancing effects on the reduction activity of nitrogen oxides at low temperatures and on the sulfur poisoning resistance.

Background Art

Nitrogen oxides ($NO_X$) are usually produced when fuels are combusted, and are exhausted from moving sources such as a motor vehicle and fixed sources such as a power plant or an incinerator. These nitrogen compounds are identified as the major causes of acid rain and smog formation. Since environmental protection regulations have become stricter recently, more studies are being carried out, in response, in order to reduce nitrogen compounds through catalysts.

As a method of removing nitrogen compounds that were emitted from fixed sources, selective catalytic reduction (SCR) device that uses vanadium oxides ($V_2O_5$) as active materials impregnated on titanium oxide carriers have been generally used. Ammonia has been known as a most suitable reduction agent for the system.

However, for the titanium-type SCR catalysts that use ammonia as a reductant, a catalyst that operate under 300° C. is frequently required according to the working condition. Additionally, in case of a flue gas which contains sulfur oxides that easily poison the catalysts at low temperatures, catalysts that could with this problem also need to be developed.

For the $V_2O_5/TiO_2$ SCR catalyst, high catalytic de $NO_X$ activity is exhibited at 300° C. or higher. Therefore, it is necessary to develop a catalyst which shows high activity at a lower reaction temperature. Generally, when titanium oxide ($TiO_2$) supporters and vanadium (V) are used as active catalytic materials, additional amount of vanadium is added to increase the catalytic activity at 300° C. or lower. However, when the amount of vanadium is increased, the oxidation of sulfur dioxide ($SO_2$) that are contained in the exhaust gas to sulfur trioxide ($SO_3$) is induced, which then react with slipped ammonia. As a result, ammonium bisulfate, $NH_4HSO_4$ which is a solid salt, is formed.

The produced ammonium bisulfate salts are imbedded into the surfaces of the catalysts, thereby interfering with the reduction reaction. As a result, as the amount of unreacted ammonia increases, formation of sulfur trioxides ($SO_3$) is promoted, thereby accelerating the sulfur poisoning, which eventually shorten the life of the catalysts.

Therefore, catalysts that can improve catalytic activity at low temperatures without promoting the oxidation of sulfur dioxides have been developed. In general, in order to enhance low temperature activity and sulfur poisoning resistance, tungsten has been added to vanadium/titania catalysts as a promoter. For example, when tungsten oxides were added, sulfur poisoning resistance at low temperatures could be increased.

However, since the amount of tungsten oxides used is high, approximately between 5 wt. % and 10 wt. %, the increase in the price of catalysts is unavoidable.

Moreover, most of the conventional catalysts for removal of nitrogen oxides with less sulfur poisoning have been developed such that a carrier is impregnated with special active materials.

Conventional art uses a $TiO_2$ carrier impregnated with vanadium sulfate ($VSO_4$), vanadyl sulfate ($VO\ SO_4$) and the like, and is reacted at the range of temperatures at 300-520°. However, the problem of the previously-explained sulfur poisoning also arises in this case due to the usage of vanadium.

According to another conventional art, $TiO_2$ carrier impregnated with active materials such as $V_2O_5$, $MoO_3$, WO3, $Fe_2O_3$, $CuSO_4$, $VOSO_4$, $SnO_2$, $Mn_2O_3$, $Mn_3O_4$ are used. However, not only the problem of the sulfur poisoning from vanadium oxides still exists, but also, the previously-mentioned high cost problem due to the usage of tungsten oxides are accompanied.

SUMMARY OF THE INVENTION

The present invention provides for catalysts for the reduction of nitrogen oxides that are impregnated into carriers and contain vanadium as an active material and antimony as a promoter that promote reduction of nitrogen oxides at low temperatures and increase sulfur poisoning resistance.

Another embodiment of the present invention provides for the transition metal oxides carriers, titanium oxides, silicate, zirconia, alumina and the mixture thereof, where vanadium and antimony can be impregnated.

Another embodiment of the present invention provides that the amount of said vanadium impregnated is 1-3 wt. %.

Another embodiment of the present invention provides that the amount of said antimony impregnated is 0.5-7 wt. %.

BRIEF DESCRIPTION OF THE DRAWING(S)

DETAILED DESCRIPTION OF EMBODIMENTS OF THE INVENTION

As mentioned above in relation to the conventional arts, nitrogen oxides can be reduced to harmless nitrogen and water by using a reductant. Catalysts for the reduction of nitrogen oxides are used and each of these catalysts comprises a carrier, an active material and a promoter which reduces sulfur poisoning and enhances low temperature catalytic activity.

For the carrier, titanium oxides, silicate, zirconia, alumina and the mixture thereof can be used. Preferably, titania ($TiO_2$) is used.

Moreover, active and promoting materials comprise materials such as vanadium and antimony, respectively. The vanadium includes a compounds (solution) that contains vanadium oxides, and the antimony (Sb) includes compounds (solution) that contains antimony oxides, antimony chlorides ($SbCl_3$) and the like. Among the impregnated active and promoting materials, vanadium oxide is used as a main catalyst and the antimony oxide is used as an auxiliary catalyst.

The present invention uses titanium oxide ($TiO_2$) as a carrier to combine the vanadium (V) and antimony (Sb) to prepare catalysts for the reduction of nitrogen oxides. When preparing the catalysts, impregnation method, which uses the $TiO_2$ and precursors containing vanadium and antimony, or other conventional catalyst synthesis methods such as sol gel method can be used.

According to the present invention, antimony is added to promote the reactivity at low temperatures and the sulfur poisoning resistance. Preferably, 0.5-6 wt. % of antimony is added. By the addition of antimony as a promoter, the added amount of vanadium can be reduced, and thus, the sulfur poisoning resistance can be reduced. Preferably, 1-3 wt. % of vanadium is added.

The present invention will be further illustrated by the following examples in order to provide a better understanding of the invention. However, the present invention is not limited to the examples, and particularly, the substances that constitute each layer can be other substances that provide the technical effects of the present invention.

Figure 1:
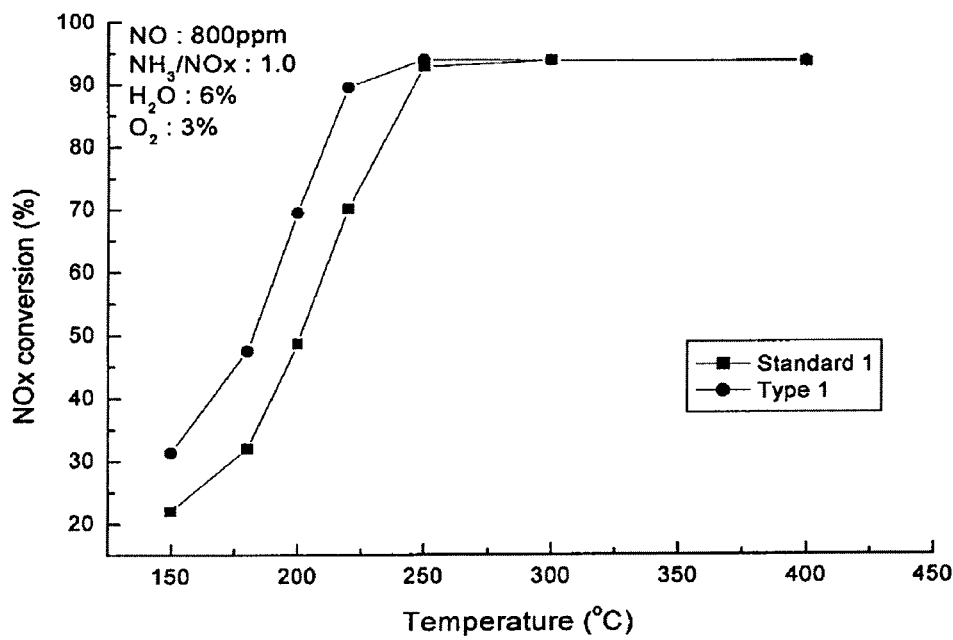
FIG. 1 is a graph showing the NO conversions of Example 1 and Reference 1 at different temperatures.

FIG. 1 shows NO conversion without the presence of antimony according to Reference 1 (standard 1) and one with antimony at different temperatures according to Example 1 (type 1) of the present invention.

Reference 1 uses titanium oxide ($TiO_2$) carrier, without antimony added and impregnated with 2 wt. % of vanadium as an active material. Example 1 uses titanium oxide ($TiO_2$) carrier which is impregnated with 2 wt. % of vanadium as an active material and 2 wt. % of antimony oxide as a minor catalyst. The amounts of nitrogen oxides and ammonia used are each 800 ppm, the amount of water is 6%, and the amount of oxygen is 3%.

Figure 2:
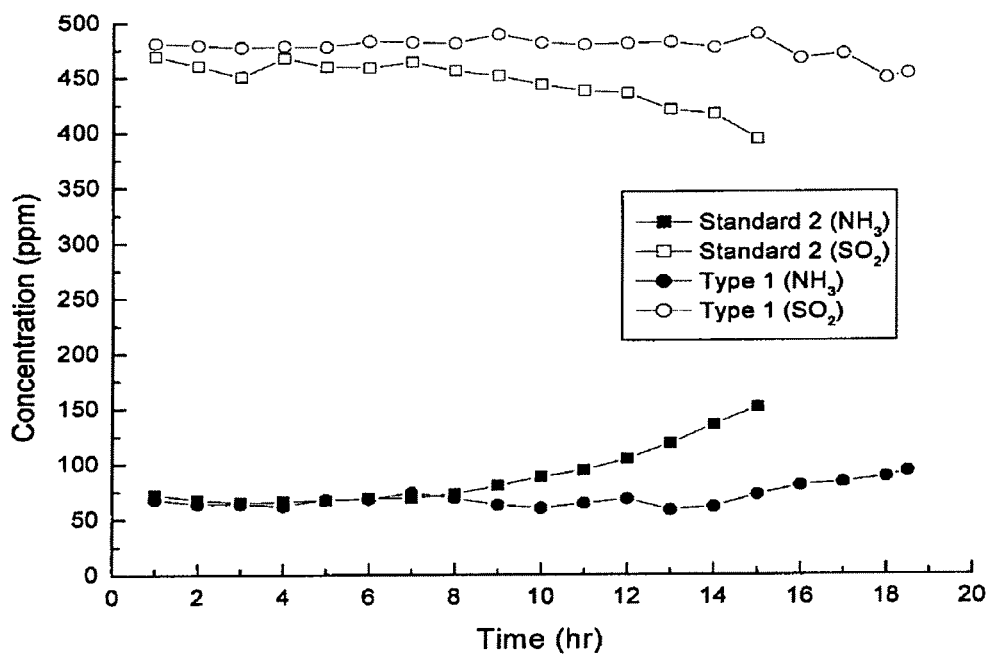
FIG. 2 is a graph showing the sulfur poisoning resistance of Example 1 and Reference 1 when ammonia was used as a reductant at 240° C.

FIG. 2 shows sulfur poisoning resistances of Example 1 (type 1) with antimony added and Reference 1 (standard 1) without antimony added when ammonia was used as a reductant at 240° C. The same results were observed for Reference 1 and Example 1 as is shown in FIG. 1, and the amount of nitrogen oxides and ammonia used were each 800 ppm. Moreover, the amount of water and oxygen used were 6% and 3%, respectively. In FIG. 2, Reference 1 ($NH_3$) line and Example 1 ($NH_3$) line each represent the amount of unreacted ammonia, and Reference 1 ($SO_2$) line and Example 1 ($SO_2$) line each represent the amount of sulfur dioxides.

As shown in FIG. 2, in case of a high NO removal rate as in Example 1 (type 1), since most of the ammonia provided is exhausted during the NO removal process, the amount of unreacted ammonia can be decreased, and the amount of emitted sulfur dioxide is nearly similar to the amount of the provided sulfur dioxide of 500 ppm, it can be inferred that almost no oxidation of sulfur dioxide occurred.

However, it is shown in Reference 1 that the amount of unreacted ammonia is increased after about 10 hours, and the amount of sulfur dioxide is decreased due to oxidation. The reduction of the NO conversions after about 10 hours, also called deactivation, was clearly indicated.

Example 1 (type 1), which added antimony as a minor catalyst, showed changes related to the amounts of unreacted ammonia and sulfur dioxide after 16 hours. Thus, not until after 16 hours, could it be determined that sulfur poisoning has occurred. Therefore, as shown in FIG. 2, when antimony was added as a promoting catalyst, the sulfur poisoning resistance was increased.

Figure 3:
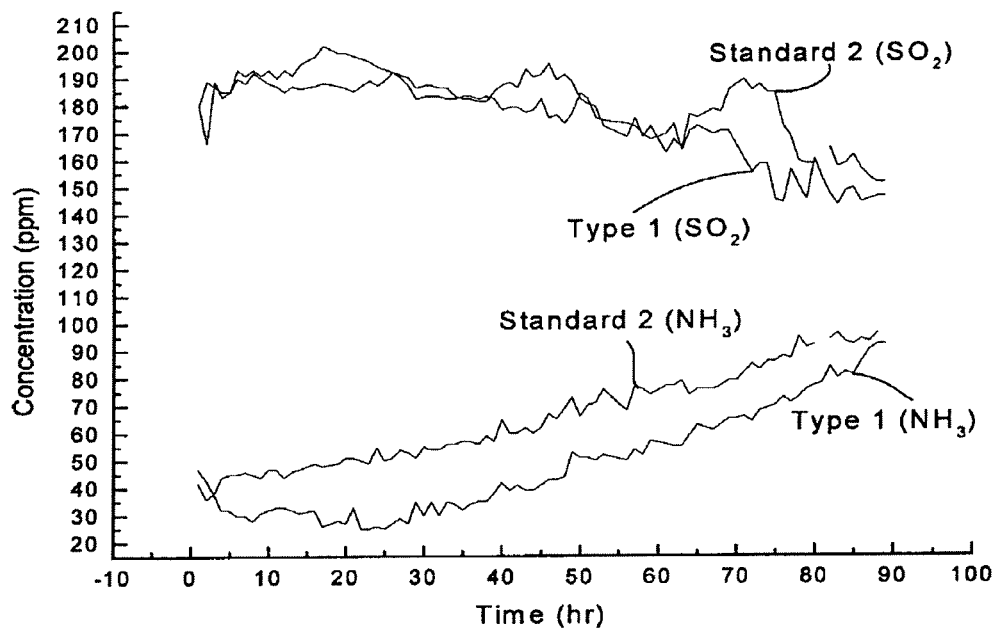
FIG. 3 is a graph showing the sulfur poisoning resistance of Example 1 and Reference 2 at 230° C.

FIG. 3 compares the sulfur poisoning resistance of Example 1 with that of another Reference 2 (standard 2) using another catalyst at 230° C. Example 1 (type 1) is under the same condition as mentioned above, reference 2 representing a common catalyst that is impregnated with 1 wt. % of vanadium to a titanium oxide carrier and 10 wt. % of tungsten as a promoting catalyst.

The injected nitrogen oxides and ammonia amounts are each 200 ppm, and the amount of sulfur dioxide is also 200 ppm. Moreover, the amounts of water and oxygen are 12.3% and 3%, respectively.

As shown in FIG. 3, in case of a high removal rate according to Example 1, the increase in the amount of unreacted ammonia at different time periods was smaller than Reference 2 (standard 2), and the decrease amount of sulfur dioxide compared to Reference 2 was also smaller. Accordingly, Example 1 was shown to exhibit a remarkably higher sulfur poisoning resistance than the conventional catalyst of Reference 2.

Figure 4:
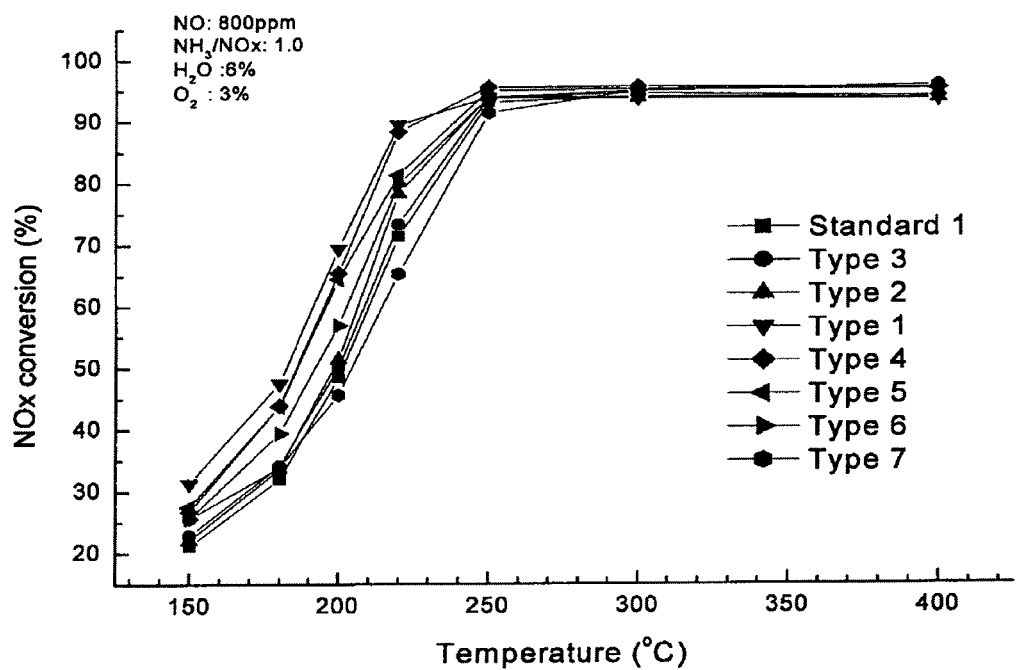
FIG. 4 is a graph showing the NO conversions of Examples 1 to 7 and Reference 1 at different temperatures.
Figure 5:
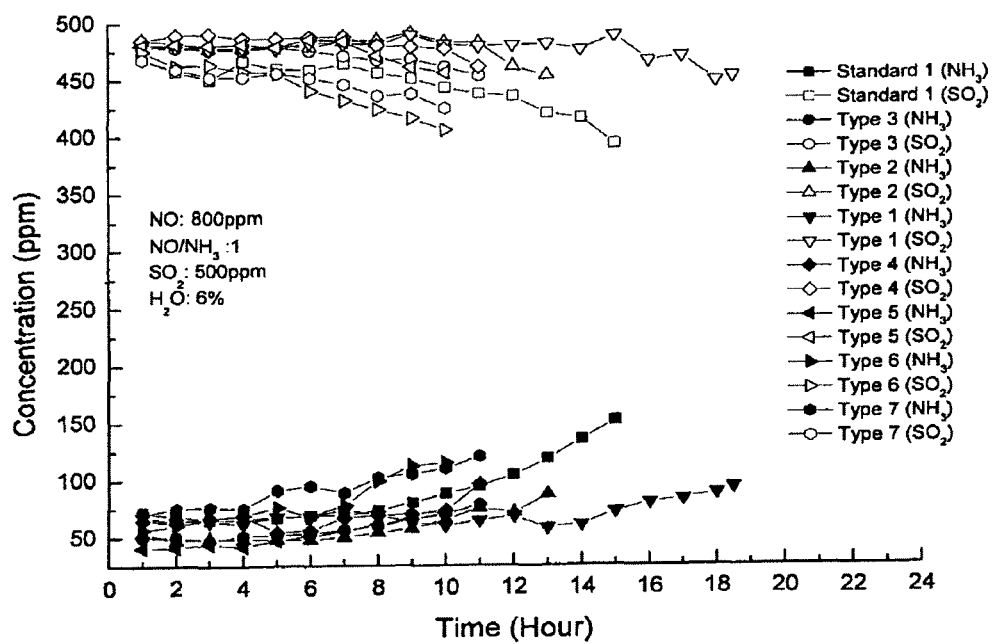
FIG. 5 is a graph comparing the sulfur poisoning resistance of Examples 1 to 7 with Reference 1.

FIG. 4 and FIG. 5 represent sulfur poisoning resistances and the NO conversion of Reference 1 (standard 1) and Examples 1 to 7 (types 1 to 7).

Example 1 (type 1) and Reference 1 (standard 1) are same as explained above.

Example 2 (type 2) represents catalysts that were prepared by impregnating a titanium oxide ($TiO_2$) carrier with 2 wt. % of vanadium and 1 wt. % of antimony. Example 3 shows catalysts that were prepared by impregnating a titanium oxide ($TiO_2$) carrier with 2 wt. % of vanadium and 0.5 wt. % of antimony. Example 4 shows catalysts that were prepared by impregnating a titanium oxide ($TiO_2$) carrier with 2 wt. % of vanadium and 3 wt. % of antimony. Example 5 (type 5) shows catalysts that were prepared by impregnating a titanium oxide ($TiO_2$) carrier with 2 wt. % of vanadium and 5 wt. % of antimony. Example 6 (type 6) shows catalysts that were prepared by impregnating a titanium oxide ($TiO_2$) carrier with 2 wt. % of vanadium and 7 wt. % of antimony. Example 7 (type 7) shows catalysts that were prepared by impregnating a titanium oxide ($TiO_2$) carrier with 2 wt. % of vanadium and 10 wt. % of antimony. In FIG. 4 and FIG. 5, the amount of nitrogen oxides and ammonia added are each 800 ppm, 500 ppm for sulfur dioxide, and 6% and 3% for water and oxygen, respectively.

First, as shown in FIG. 4, the removal activity at low temperatures according to Examples 1 to 6 (types 1 to 6), except for Example 7 (type 7), was shown to be higher than that of Reference 1. Therefore, it was shown that the range of the amount of antimony that increases the removal activity at low temperature is 0.5-7 wt. %. There can be a deviation of that range of antimony due to the standard of error.

Moreover, the amount of vanadium added is preferably 2 wt. %, however considering the conventional process errors, it is preferred to add a range of 1-3 wt. %. According to FIG. 5, other than in Example 7 (type 7), Examples 1 to 6 (types 1 to 6) showed an increase in the amount of unreacted ammonia and a decrease in the amount of sulfur dioxide with time compared to Reference 1. Accordingly, it can be shown that Examples 1 to 6 all have an increased sulfur poisoning resistance compared to Reference 1. Therefore, the amount of antimony that increases the sulfur poisoning resistance is in the range of 0.5-7 wt. %. There can be a deviation of that range of antimony due to a conventional process errors. Additionally, although the added vanadium is preferably 2 wt. %, a range of 1-3 wt. % is considered to be within the standard of common error.

What is claimed is:

1. A method of reducing nitrogen oxides produced during fuel combustion, at a temperature of 300° C. or lower, by using a catalyst, the method comprising:
    processing the nitrogen oxides being produced during said fuel combustion with a supporter comprising titanium dioxide ($TiO_2$); an active material comprising vanadium compounds; and a promoter comprising antimony compounds,
    wherein the catalyst is active in nitrogen oxides reduction at a temperature of 300° C. or lower and has sulfur poisoning resistance,
    wherein the active material is comprised in 1-3 wt. % and the promoter is comprised in 0.5-7 wt. % based on the total weight of the catalyst.

2. The method of claim 1, wherein the active material comprises vanadium oxides.

3. The method of claim 1, wherein the promoter comprises antimony oxides.

4. The method of claim 1, wherein the nitrogen oxides reduction is carried out in an efficiency of 90% or higher.

5. The method of claim 1 which is selective catalytic reduction (SCR) of nitrogen oxides.

6. The method of claim 1, wherein the temperature is 230-300° C.

7. The method of claim 1, wherein the catalyst consists of:
    said supporter comprising titanium dioxide ($TiO_2$); said active material comprising vanadium compounds; and said promoter comprising antimony compounds,
    wherein the active material is comprised in 1-3 wt. % and the promoter is comprised in 0.5-7 wt. %, based on the total weight of the catalyst.

* * * * *